United States Patent [19]

Reuter

[11] 4,343,343
[45] Aug. 10, 1982

[54] ELONGATABLE REINFORCEMENT CORD FOR AN ELASTOMERIC ARTICLE

[75] Inventor: René F. Reuter, Warken, Luxembourg

[73] Assignee: The Goodyear Tire & Rubber Company, Akron, Ohio

[21] Appl. No.: 229,374

[22] Filed: Jan. 29, 1981

[51] Int. Cl.³ .......................... B60C 9/00; D02G 3/00
[52] U.S. Cl. ...................... 152/359; 57/210;
57/229; 57/902; 156/110 C; 428/377
[58] Field of Search .............. 428/375, 378, 373, 377,
428/395; 57/237, 238, 240, 241, 242, 222, 225,
229, 232, 234, 212, 210, 902; 152/359; 156/110
C

[56] References Cited

U.S. PATENT DOCUMENTS

| | | | |
|---|---|---|---|
| 2,477,652 | 8/1949 | Robbins | 57/210 X |
| 2,755,214 | 7/1956 | Lyons et al. | 152/359 X |
| 3,395,744 | 8/1968 | Wolf et al. | 428/259 X |
| 3,429,354 | 2/1969 | Brooks | 57/210 X |
| 3,625,809 | 12/1971 | Caroselli et al. | 57/229 X |
| 4,024,895 | 5/1977 | Barron | 57/210 X |
| 4,240,486 | 12/1980 | Schmit et al. | 57/210 X |
| 4,261,406 | 4/1981 | Chemizard | 152/359 X |

*Primary Examiner*—Lorraine T. Kendell
*Attorney, Agent, or Firm*—Frank Pincelli; L. R. Drayer

[57] ABSTRACT

An elastomeric article and a composite cord for reinforcing an elastomeric article. The cord comprises a core spirally wrapped by at least one high tenacity, substantially inextensible yarn. The core is composed of at least one unoriented polymeric filament which has an initial modulus of elasticity of at least 1000 newtons/mm² and an elastic limit of at least one kilogram. The core has a length at break which is greater than the length of the yarn when the yarn is fully stretched out to permit stretching out of the yarn without rupture of the core for expansion of an elastomeric article and reinforcement thereof in the expanded condition.

6 Claims, 4 Drawing Figures

ELONGATABLE REINFORCEMENT CORD FOR AN ELASTOMERIC ARTICLE

This invention relates to reinforcement cords for elastomeric articles, and, more particularly, the reinforcement of elastomeric articles with elongatable cords.

Since the introduction of the radial tire, it has been desirable to develop a process for building such a tire in a single stage wherein the tire components including the belt structure and tread can be assembled on a tire building drum in cylindrical form before expanding the assembly to toroidal shape. Such a process is considered more economical and efficient as compared to the prevalent standard process which requires the expansion of the uncured tire to near its final toroidal shape before the belt structure and tread are applied.

It is an object of this invention to provide an elongatable reinforcing cord so that tires such as radial tires may be built in a more efficient and economical manner.

It is an another object of this invention to provide a process for building elastomeric articles such as collapsible spare tires in a collapsed state for storage whereby they are expandable to regular size for use.

To acquaint persons skilled in the arts most closely related to the present invention, certain preferred embodiments thereof illustrating a best mode now contemplated for putting the invention into practice are described herein by and with reference to the annexed drawing forming a part of the specification. The embodiments shown and described herein are illustrative and as will become apparent to those skilled in these arts can be modified in numerous ways within the spirit and scope of the invention defined in the claims hereof.

In the drawings: FIG. 1 is a perspective view of a composite cord embodying this invention;

Figure 1:
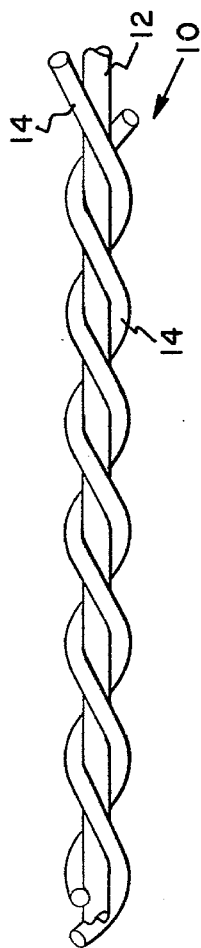

Referring to FIG. 1, there is shown a composite cord 10 which is utilized to reinforce elastomeric articles such as tires. This composite cord 10 comprises a core 12 around which is spirally or helically wrapped one or more high tenacity substantially inextensible yarns 14. In FIG. 1, two such yarns 14 are shown wrapped about the core 12. By "high tenacity substantially inextensible yarns", it is meant that the yarns may be composed of any suitable reinforcing material which is conventionally used for reinforcing cords in a particular type of elastomeric article. For reinforcing most elastomeric articles, these yarns 14 have a tenacity of at least 6 grams per denier. Among the materials which may be used for such yarns are, by way of example only, rayon, nylon, polyester, aramid, glass fiber, polyvinylalcohol, and steel. Each of the yarns 14 may be composed of a plurality of filaments which are cabled together or twisted around each other. In the stretched out condition, the length of each yarn 14 is equal to a predetermined distance over which the yarn 14 should extend in the article when expanded and in use.

The core 12 should have an elongation at break which is sufficient to allow it to be lengthened to a length greater than the length of the yarn 14 when the yarn 14 is fully stretched out to permit stretching out of the yarn 14 without rupture of the core 12 for elongation of an elastomeric article and reinforcement thereof in the elongated condition. For many applications, it is necessary that the elongation before break of the core 12 be at least 200 percent.

The core 12 should also have a modulus of elasticity and an elastic limit sufficient to resist and recover from normal tension forces on the cord 10 during processing of the cord 10. In order to resist and recover from such forces, the initial modulus of elasticity should be at least 1000 newtons/mm$^2$ and should preferably be between 1500 and 4500 newtons/mm$^2$. The elastic limit of the core 12 should be at least one kilogram.

It has been found that unoriented polymeric filaments such as those of the group consisting of polyamides and polyesters possess the above-defined properties. It is common practice in the production of man-made yarn to subject the filaments thereof to a drawing process after the spin process. In accordance with one method of the drawing, the spun filaments are fed around (with several wraps) a top heated rotating roll, down past a heated platen and around (with several wraps) a bottom roll which is rotating faster than the top roll. During such a process, a filament of yarn is elongated as much as 200 to 700 or more percent before it will accept a high degree of permanent orientation. "Orientation" refers to the degree of parallelism of the chain molecules of a polymer. A resulting oriented polymeric filament will remain substantially permanently extended and much stronger than in the undrawn form. An application of only moderate force is required to elongate the filament during the drawing process. It is recognized that a certain amount of drawing of perhaps 10 or 20 percent may occur during normal processing so that a completely undrawn polymeric filament may not be obtainable in practice. For the purposes of this specification and the claims, an "unoriented polymeric filament" is defined as a polymeric filament which is undrawn or only partially drawn after the spin process so that an application of only moderate force (for example, 4 grams per denier) is required to elongate it to a length which is at least 200 percent of its original length.

Figure 2:
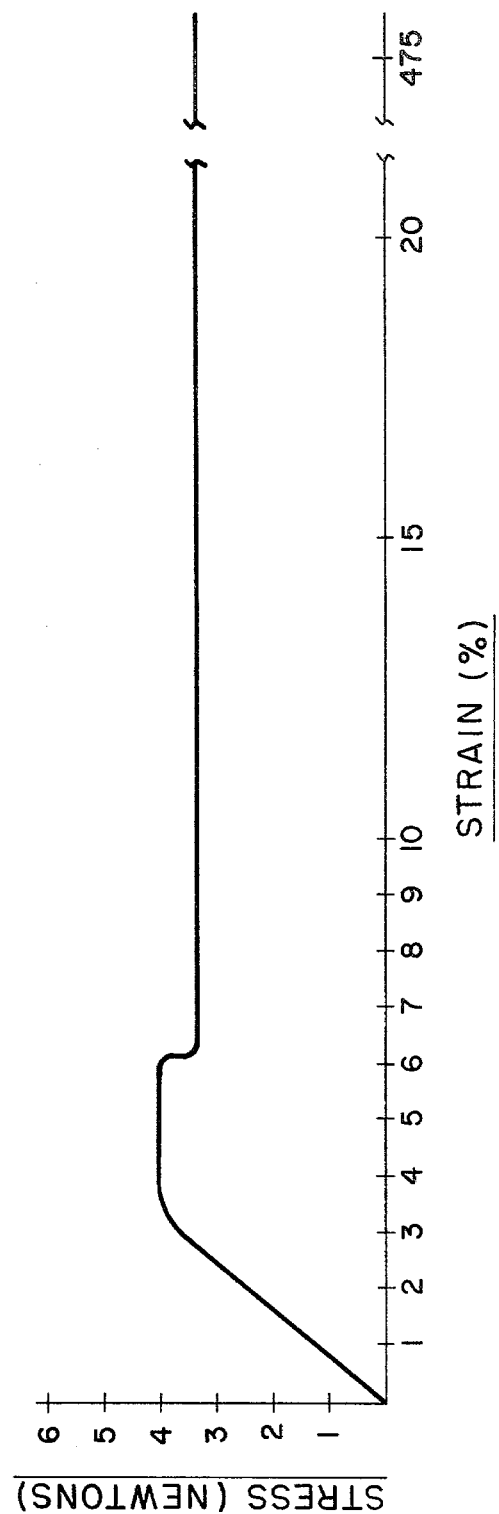
FIG. 2 is a stress/strain diagram of the core of a composite cord embodying this invention.

A typical stress/strain diagram for an unoriented polyamide filament (unstretched nylon monofilament having a gauge of 0.30 mm) is shown in FIG. 2. The initial modulus of elasticity is 1700 newtons/mm$^2$. It has an elastic limit at about 3 or 4 newtons after which it will ultimately elongate about 475 percent before it accepts a high degree of permanent orientation. At this point of permanent orientaton (not shown), it will have a tensile strength at break of about 130 newtons/mm$^2$.

The core 12 may contain a monofilament as shown in FIG. 1 or it may contain more than one filament.

The core 12 may be coated in a conventional manner with a rubberized compound before the yarns 14 are wrapped about it.

The reinforcing cord 10 may be provided in either or both of the plies or belts of either bias or radial tires. When such cords 10 are provided in a radial tire, the tire may be built in a single stage wherein the tire components including the belt structure can be assembled on the tire building drum in cylindrical form. The cords 10 will then elongate during the process of expanding the assembly to toroidal shape.

Figure 3:
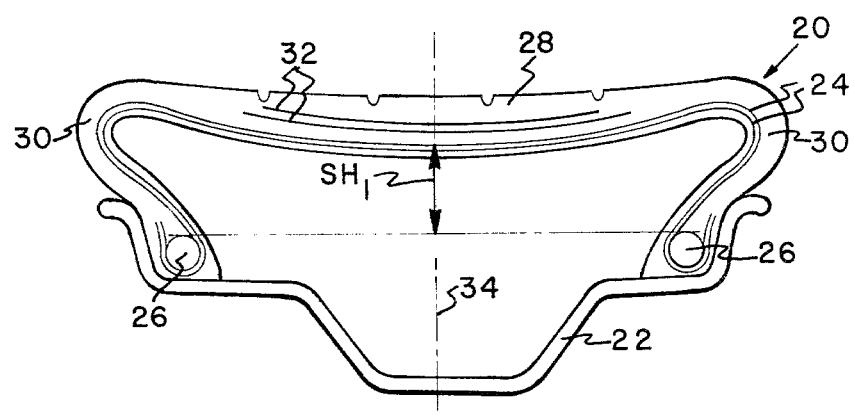
FIG. 3 is a sectional view taken in a radial plane of a tire embodying this invention mounted on a rim prior to inflation of the tire.
Figure 4:
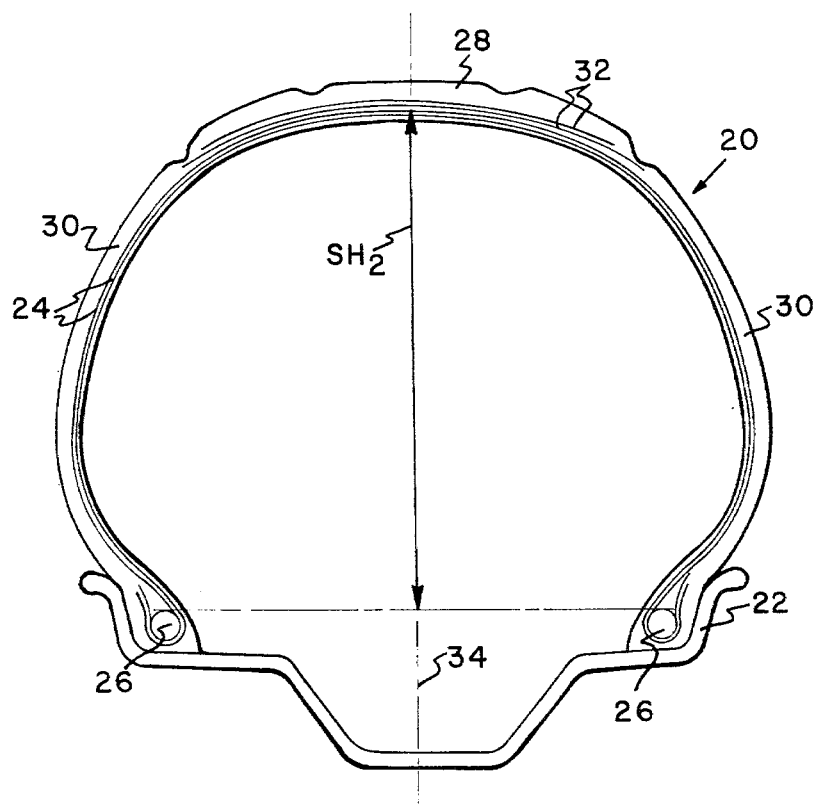
FIG. 4 is a view similar to that of FIG. 3 showing the tire of FIG. 3 inflated.

Another application of the reinforcing cords 10 of this invention is shown in FIGS. 3 and 4. In FIG. 3 is shown a molded and vulcanized pneumatic tire 20 mounted on a rim 22 and uninflated for use as a spare tire on a vehicle. The tire 20 has a carcass of two plies 24 of reinforcing cords extending between a pair of circular inextensible beads 26. A circumferentially extending tread 28 is provided centrally between the beads 26 and outwardly of the carcass plies 24. A pair of sidewalls 30 extend from the tread edges to the beads 26, respectively. A pair of belts 32 is provided between the tread 28 and carcass plies 24.

The tire 20 is a radial tire. By radial tire is meant its carcass cords extend at an angle relative to and at the mid-circumferential plane of the tire of substantially 90 degrees; that is, between 75 and 90 degrees. By mid-circumferential plane is meant a plane, illustrated at 34 in FIG. 4, extending midway between the axially outermost points of the carcass plies when a tire is mounted on a rim, unloaded, and inflated to a rated inflation pressure for the tire. "Axial" or "axially" refers to a direction parallel to the axis of rotation of a tire. The reinforcing cords in the belts 32 extend at a bias angle relative to and at the mid-circumferential plane 34 of the tire 20. While two belts are shown, the tire 20 may contain only one belt with the cords extending in a direction generally parallel to the mid-circumferential plane 34, or the tire may contain more than two belts. Likewise, the tire 20 may contain only one carcass ply or it may contain more than two such plies.

The tire 20, when uninflated and prior to use, has a first section height $SH_1$. "Section height" is defined herein as the distance in a direction perpendicular to the axis of rotation of a tire and in a radial plane of a tire between the radially innermost of the beads and the intersection of the mid-circumferential plane 34 with the radially outermost of the carcass plies 24 and is illustrated as $SH_1$ and $SH_2$ in FIGS. 3 and 4, respectively. A radial plane is one which contains the axis of rotation of a tire. The term "radially" refers to a direction perpendicular to the axis of rotation of a tire.

The tire 20 is inflatable for use to the shape shown in FIG. 4 wherein it has a second section height $SH_2$ which is at least 50 percent greater than the first section height $SH_1$.

The reinforcing cords in both the carcass plies 24 and the belt structure 32 are of the elongatable type shown in FIG. 1. During inflation of the tire 20 to the shape shown in FIG. 4, the cords will elongate to achieve the appropriate dimensions for the tire. Unlike conventional radial tires whose carcass cords ae inextensible and do not elongate during the shaping process, the tire 20 shown in FIGS. 3 and 4 is built such that the distance between the beads 26 is the same or only greater by a small amount than the distance, as shown in FIG. 4, between the beads 26 of the tire 20 when inflated for use. This permits premounting of the tire 20 on a rim 22 as shown in FIG. 3 before its expansion for use. Therefore, during the inflation of the tire 20, the distance between the beads 26 remains constant and the carcass cords are lengthened.

An example of an elongatable cord 10 embodying this invention and which may be useful in a typical tire construction has a core 12 of three 0.5 mm. diameter unstretched polyamide 6 monofilaments twisted together at 7 turns per inch in the Z-direction. The yarn 14 is 1500/1 denier, adhesive-treated aramid twisted at 7 turns per inch in the Z-direction. Two of the aramid plies are twisted around the core at 14 turns per inch in the S-direction. The core 12 has a gauge of 1 mm., an elongation at break of 265 percent of its unstretched length, a breaking strength of 5 kg., and a tensile strength at 2 percent elongation of 0.7 kg. The aramid yarn 14 has an elongation at break of 4.1 percent of its length before elongation, and a breaking strength of 23 kg. The resulting cord 10 has an elongation at break of 168 percent of its length before elongation, a breaking strength of about 40 kg., and a tensile strength at 65 percent elongation of 2.2 kg.

Another example of such an elongatable cord 10 has a core 12 of two 0.5 mm. diameter unstretched polyamide 6 monofilaments twisted together at 10 turns per inch in the Z-direction. The yarn 14 is 1260/1 denier adhesive treated polyamide (nylon 6,6) twisted at 10 turns per inch in the Z-direction. Two of the plies of yarn 14 are twisted around the core 12 at 10 turns per inch in the S-direction. The resulting cord 10 has an elongation at break of 120 percent of its length before elongation, a breaking strength of 20.5 kg., and a tensile strength of 65 percent elongation of 2.7 kg. As is apparent from the foregoing examples, the elongation at break of a cord made according to this invention is substantially greater than one hundred percent of its length before elongation.

The particular dimensions of cords for specific applications may be selected by utilizing principles commonly known by persons of ordinary skill in the art to which this invention pertains. Where dimensions in this specification are expressed in inches, they may be converted to centimeters by multiplying by 2.54.

An example of another useful function for the elongatable cords 10 of this invention is in a carcass overlay of a radial tire. A carcass overlay may be described as a layer of cords extending substantially parallel to the mid-circumferential plane and located under the tire belt structure to link the radial carcass cords circumferentially and thereby increase the circumferential carcass modulus.

While certain representative embodiments and details have been shown for the purpose of illustrating the invention, it will be apparent to those skilled in the art that various changes and modifications may be made therein without departing from the spirit or scope of the invention.

What is claimed is:

1. A composite cord for reinforcing an elastomeric article comprising a core composed of at least one unoriented polymeric filament selected from the group consisting of polyamides and polyesters, said core having an initial modulus of elasticity of between 1500 and 4500 newtons/mm$^2$ and an elastic limit of at least one kilogram, the cord further comprising at least one high tenacity substantially inextensible yarn spirally wrapped about said core, said core having an elongation at break of at least 200 percent and a length at break which is greater than the length of said yarn, when said yarn is fully stretched out to permit stretching out of said yarn without rupture of said core, the cord having an elongation at break of at least 100 percent of its length before elongation.

2. A vulcanized pneumatic tire reinforced with a plurality of composite cords, the tire having a first section height when mounted on a rim prior to inflation thereof and being inflatable to a second section height which is at least 50 percent greater than said first section height, each of said cords comprising a core composed of at least one unoriented polymeric filament which has a modulus of elasticity of between 1500 and 4500 newtons/mm$^2$ and an elastic limit of at least 1 kilogram, each cord further comprising at least one high tenacity substantially inextensible yarn spirally wrapped around said core, said core having a length at break which is greater than the length of said yarn when said yarn is fully stretched out to permit stretching out of said yarn without rupture of said core during inflation of the tire to said second section height, said core having an elongation at break of at least 100 percent of its length before elongation.

3. The pneumatic tire of claim 1, wherein the tire is a radial tire.

4. The pneumatic tire of claim 1, wherein the pneumatic tire is a bias tire.

5. The pneumatic tire of claims 3 or 4, wherein the tire has at least one belt which is reinforced with a plurality of said cords.

6. The pneumatic tire of claims 3 or 4, wherein the tire has a carcass which is reinforced with a plurality of said cords.

* * * * *

UNITED STATES PATENT AND TRADEMARK OFFICE
CERTIFICATE OF CORRECTION

PATENT NO. : 4,343,343
DATED : August 10, 1982
INVENTOR(S) : Rene Francois Reuter It is certified that error appears in the above-identified patent and that said Letters Patent are hereby corrected as shown below:

claim 2, line 16, the word "core" should read -- cord -- .

Signed and Sealed this

First Day of February 1983

[SEAL]

Attest:

GERALD J. MOSSINGHOFF

Attesting Officer

Commissioner of Patents and Trademarks